July 11, 1939.  D. M. LIGHT  2,165,864
BRAKE GEAR SAFETY GUARD
Filed March 4, 1938  2 Sheets-Sheet 1

INVENTOR
DAVID M. LIGHT
BY Rodney Bedell
ATTORNEY

July 11, 1939.  D. M. LIGHT  2,165,864
BRAKE GEAR SAFETY GUARD
Filed March 4, 1938  2 Sheets-Sheet 2
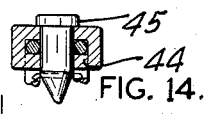
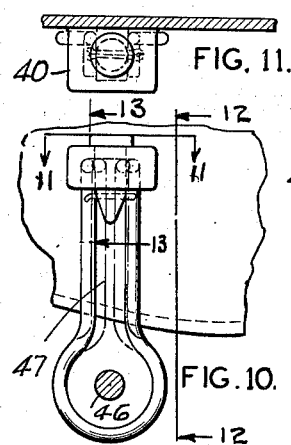
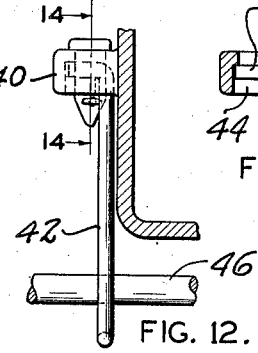
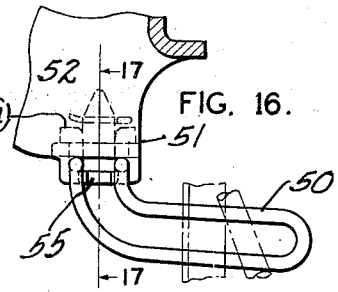
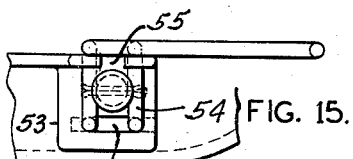
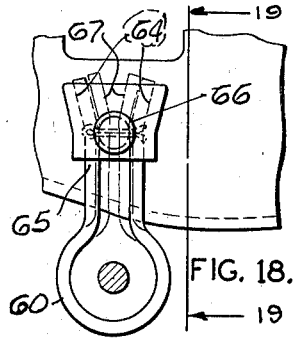
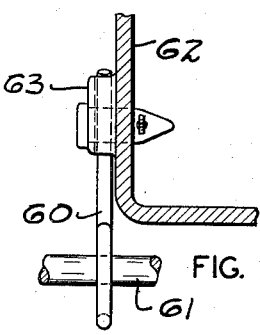
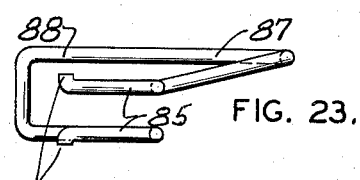
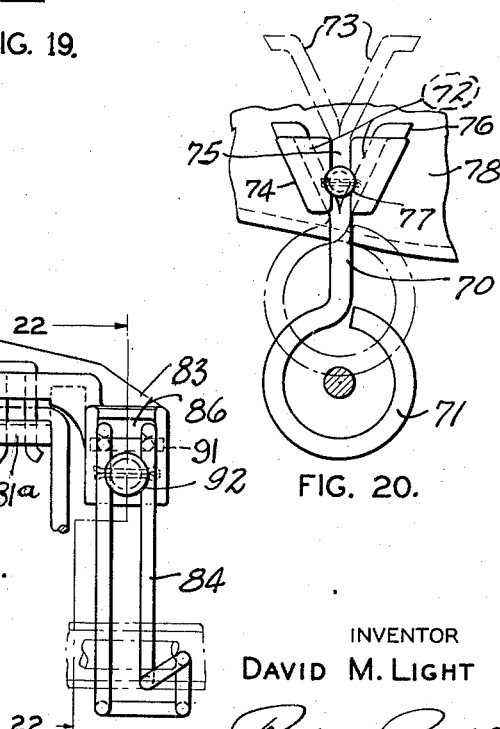
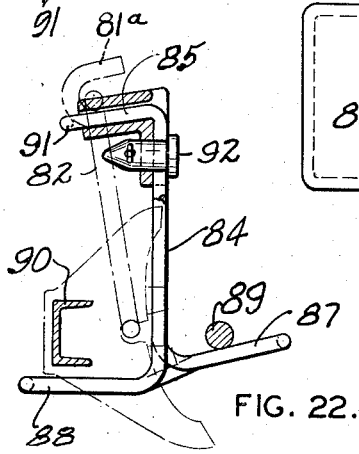
INVENTOR
DAVID M. LIGHT
BY Rodney Bedell
ATTORNEY Patented July 11, 1939

2,165,864

UNITED STATES PATENT OFFICE 2,165,864

BRAKE GEAR SAFETY GUARD

David M. Light, Chicago, Ill., assignor to Chicago Railway Equipment Company, Chicago, Ill., a corporation of Illinois Application March 4, 1938, Serial No. 193,858

21 Claims. (Cl. 188—210)

The invention relates to railway rolling stock devices for supporting, guarding, or guiding brake beams, brake connection rods, and other brake gear, and more particularly to such devices mounted on the truck.

The main object of the invention is to simplify the brake gear support devices and to facilitate their application to and removal from the truck main part on which they are mounted.

Another object is to construct a support so that it may be applied to different truck parts such as the bolster, side frame, spring plank or other spring seat.

Another object of the invention is to avoid play between the parts resulting in rattling and undue wear.

These and other detailed objects as will appear from the following description are attained by the structures illustrated in the accompanying drawings, in which—

Figures 7, 8:
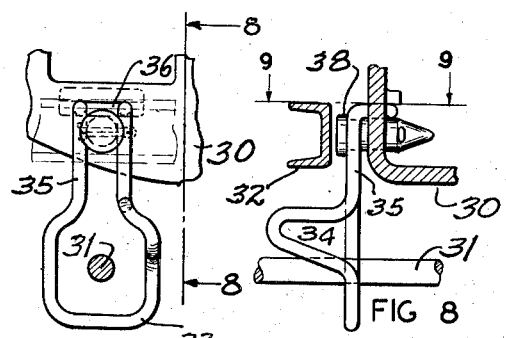
Figure 7 is a view similar to Figure 5 but illustrating another form of the invention.
Figure 8 is a transverse vertical section taken approximately on the line 8—8 of Figure 7.
Figure 5:
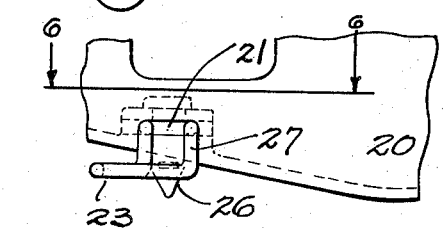
Figure 5 is a side elevation of a portion of a truck bolster and associated brake gear support embodying another form of the invention.

Figure 10 corresponds to Figures 5 and 7 but illustrates another form of the invention.

Figure 11 is a horizontal section taken on the line 11—11 of Figure 10.

Figures 12 and 13 are vertical transverse sections taken on the lines 12—12 and 13—13 of Figure 10.

Figure 14 is a detail vertical section taken on the line 14—14 of Figure 12.

Figure 15 is a side elevation of a portion of a truck side frame embodying another form of the invention.

Figure 16 is a top view of the structure shown in Figure 15.

Figure 17 is a vertical transverse section taken on the line 17—17 of Figure 16.

Figure 18 corresponds to Figure 10 but illustrates another form of the invention.

Figure 19 is a vertical section taken on the line 19—19 of Figure 18.

Figure 20 is a view similar to that shown in Figure 18 but illustrates another form of the invention.

Figure 21 is an end view of a truck side frame showing a bracket associated therewith and mounting another form of the brake gear guard.

Figure 22 is a longitudinal vertical section taken on the line 22—22 of Figure 21.

Figure 23 is a top view of the guard element shown in Figures 21 and 22.

In the structure illustrated in Figures 1 to 4, inclusive, those familiar with the art will recognize the truck side frame tension member 1, including bolster spring seat 1a, and strut or bolster guide 2, forming intermediate portions of the truck side frame which will be carried on the journal boxes (not shown) for the wheels 3. The drawings illustrate a brake head 4 and shoe 5 applied to the wheel and mounted on the end of a truss type brake beam, including the channel compression member 6 and round tension rod 7. The normal support for the beam is provided by the usual hanger 8 swinging from bracket 9 on the side frame. All of the above parts are well known in the art and in themselves do not constitute the present invention.

A shelf-like bracket 10 projects inwardly from the spring seat portion of the side frame and has depending ribs 11, the lower ends of which are connected by a web 12, all forming a shallow open-ended box-like structure.

The brake gear support device comprises a bar doubled on itself with its forward portion 13 underlying the brake beam 6—7 and with its end portions 14 bent at right angles to the forward portion and extending through the box structure 10—11—12. The terminals 15 are offset and engage the inner ends of webs 11 (Figure 2) to prevent disassembly of the support and the bracket carrying the same.

Ribs 11 form spaced opposing seats for the support portions 14 and the ends of the ribs nearest the side frame form shoulders or recesses for receiving the terminals 15.

A pin or key 16 passes through apertures in the bracket elements 10 and 12 and holds guard end portions 14 against movement towards each other such as would disengage the terminals 15 and the shoulders formed by the ends of ribs 11. The head of pin 16 is seated on the upwardly facing surface of flange 10 and the pin is retained by a cotter 17. Preferably the pin is pointed or tapered to facilitate its insertion and, if necessary, the spreading of the support legs 14. However, it is desired, but not essential, that the support member 13—14 be formed of spring material and give an original shape whereby the legs 14 tend to separate and the member must be distorted, as indicated in Figure 3, to permit the insertion of its ends into the supporting structure whereupon, when released from the distorting pressure, legs 14 will assume the position shown in Figure 2.

Figure 3:
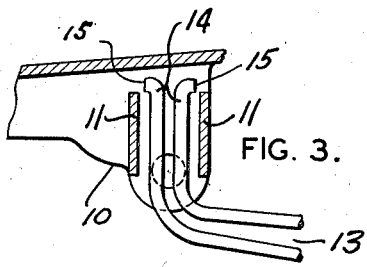
Figure 3 is a detail horizontal section taken on the line 3—3 of Figure 1.
Figure 1:
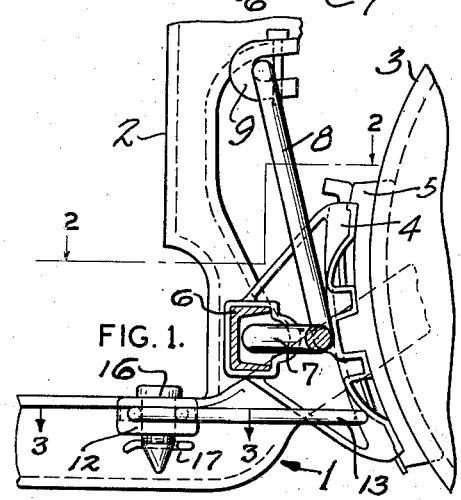
Figure 1 is an elevation of the inside of a part of a familiar type of truck frame showing a portion of one of the wheels and brake gear applicable thereto with a support arrangement embodying the present invention associated therewith.
Figure 4:
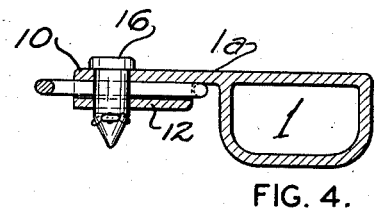
Figure 4 is a detail vertical transverse section taken on the line 4—4 of Figure 2.

Pin 16 then functions primarily as a safety securing element although, as indicated, it may function to spread legs 11 on the guard if the latter should have a permanent set approximately as shown in Figure 3. If this portion of the guard should not have been moved inwardly far enough to permit the terminals to pass beyond the inner edges of ribs 11, this will become apparent upon the attempt to insert pin 16, and this would insure the proper positioning of the support.

Figure 6:
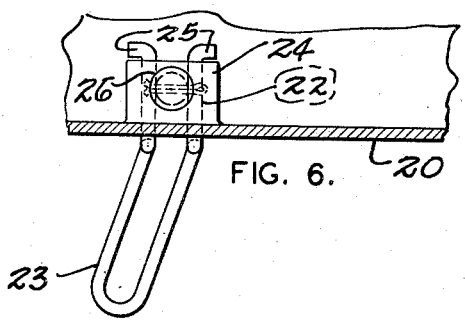
Figure 6 is a horizontal section and top view taken on the line 6—6 of Figure 5.

The arrangement illustrated in Figures 5 and 6 utilizes the same general principle although differing in detail. These figures illustrate a portion of a U-shaped or box-shaped bolster intermediate the center and side of the truck. The side wall 20 of the bolster is apertured at 21 to receive the end portions 22 of the brake beam guard, including the forward portion 23 for extending beneath the beam.

Figure 2:
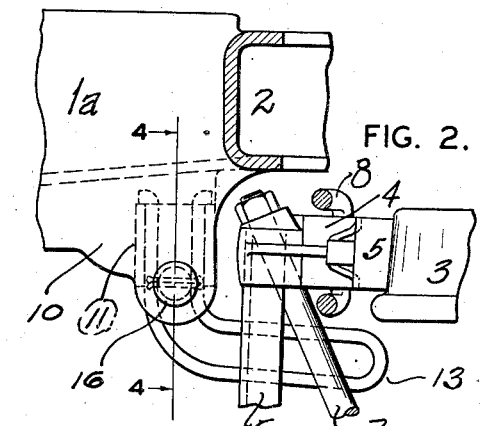
Figure 2 is a horizontal section and top view taken substantially on the line 2—2 of Figure 1.

A box-like bracket arrangement 24, similar but shorter than that shown in Figure 2, projects inwardly from the bolster side wall 20 and the inner end of this bracket forms abutments for the offset terminals 25 on the support member. A pin 26 corresponds in mounting and function to the pin 16 previously described. The guard is shown as offset vertically at 27 where its height may be varied to suit the brake beam irrespective of the height of the bolster aperture 21.

Figure 9:
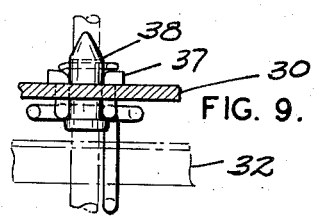
Figure 9 is a horizontal section taken on the line 9—9 of Figure 8.

Figures 7, 8 and 9 illustrate a support device applicable to the bolster 30 and arranged to guard the brake lever bottom connection rod 31 from dropping to the road bed, as well as to guard the brake beam, indicated by the channel 32, against such dropping. The guard device comprises a bar doubled on itself and disposed substantially vertically, the loop portion 33 substantially encircling bottom connection 31 and one leg of the guard having a forwardly extending loop 34 extending beneath brake beam 32. The upper end portions 35 of both legs extend alongside of the front wall of the bolster with their terminals bent at right angles to pass through the aperture 36 in the bolster wall where they are offset at 37 to engage the inner face of the wall. A pin 38 secures the support device against accidental removal from the bolster.

Figures 10 to 14 illustrate a similar arrangement in which the beam guarding function is eliminated and the box-like mounting bracket 40 projects outwardly from the bolster side wall 41 and opens downwardly. The guard structure 42 comprises a doubled bar lying substantially in a single plane except for its end portions 43 which are bent forwardly and rest upon bracket lugs 44 and are held in the recesses provided therefor by pin 45. The looped end of the support receives bottom connecting rod 46. The broken lines 47 indicate the distortion of the support member whereby its insertion and removal from the bracket is effected.

Figures 15, 16 and 17 illustrate a beam support 50 applied to a bracket 51 projecting from the side frame spring seat 52, similar to the structure illustrated in Figures 1 to 4, but the inner portion of the bracket comprises an angular section including a vertical web 53. The end portions 54 of the support member are offset vertically and horizontally and when the member is compressed to bring portions 54 together, they may be inserted through slot 55 and through an opening 56 and are then locked in position by a horizontally disposed pin 57 which holds portions 54 in opposing recesses in the bracket.

Figures 18 and 18 illustrate a form of the invention in which a safety support 60 is provided for the bottom connecting rod 61, the support being mounted on a bolster side wall 62 having a box-like bracket structure 63 with upwardly and outwardly inclined shoulders 64. The upper ends of the guard legs 65 are similarly inclined and are held in contact with shoulders 64 by pin 66. Broken lines 67 indicate the distorted position assumed by the guard when it is being inserted into bracket 63 from below.

Figure 20 illustrates another form of the invention in which one end of the support is formed by a circular portion 71 of the bar and the other end of the bar is bifurcated to form the legs 72 which may be given an initial spread, as indicated in broken lines at 73. The front face of the V-shaped bracket 74 has an opening 75 through which the bar 70 may be moved bodily, after which the support is lowered with bifurcations 73 sliding into the recesses provided in the bracket until the outturned upper ends 76 rest upon the upwardly facing shoulders of the bracket. Pin 77 then passes between the bifurcations and through the bolster wall 78 to prevent upward movement of the support bodily or of legs 72 towards each other.

In Figures 21, 22 and 23 the invention is embodied in a support applied to the end portion 80 of a truck side frame. A bracket 81 projects inwardly from the body of the frame and includes a jaw 81a which mounts the brake hanger 82 in the usual manner. An extension 83 on the brake hanger bracket forms a mounting for the brake beam support which includes upright legs 84, the upper ends 85 of which are bent to pass through the aperture 86 in bracket extension 83. The lower ends of legs 84 extend in opposite directions, as indicated at 87, 88, respectively, to underlie the brake beam tension element 89 and compression member 90. Lugs 91 on guard ends 85 engage opposing shoulders formed by bracket extension 83 to prevent withdrawal of the support so long as pin 92 is present to prevent the legs being pressed together.

Several of the support devices are illustrated as arranged for the bottom connecting rod only, and others are illustrated as arranged for underlying the brake beam only. Each of these devices may be readily converted into a support for a different brake gear member than the one illustrated usually by the simple expedient of disposing the functioning end of the device horizontally instead of vertically, or vice versa, and, if necessary, changing the direction or length of its extension from the mounting to accommodate the gear member.

It will be understood by those skilled in the art that a device which supports the bottom connection also serves as a safety device for the brake beam because of the brake levers pivoted to the bottom connection and to the brake beam. The structure shown in Figures 7, 8 and 9 includes individual supports for the bottom connection and brake beam, respectively, and any of the structures mounted on the bolsters could be arranged to provide the separate individual supports.

Each of the devices is illustrated as including a pin or key which secures or locks the legs of the support device against movement towards each other and away from their mounting seats. Obviously this is a desirable feature tending to prevent disassembly of the support device and its mounting, but it will be understood that the devices may be made sufficiently stiff to hold them pressed against their mounting seats irrespective of any forces likely to be encountered in normal operation of the truck. When so constructed the securing pins may be eliminated.

Each form of the invention embodies a simple type of support formed from a single bar and carried by a bracket on a truck main part such as the side frame or bolster. It will be understood that the bracket might be on other truck parts such as a transom, spring plank, or end rail, etc. The support may function as a safety guard only, or may be utilized as the main support of the beam or as a guide functioning in cooperation with the usual hanger or independently thereof. The term "brake gear support" includes any of the above arrangements for a brake beam and also a device used for the bottom connection only, or for both the bottom connection and brake beam.

While the use of spring material is preferred as tending to reduce play between the parts, it is to be understood that this is not essential as ordinary mild steel has some flexibility so that if the support is properly formed it will bear against the opposing bracket elements. Irrespective of such formation, the proper sizing of the holding keys or pins will provide a snug fit between the parts of the assembled structure.

It is to be understood that the various forms described are merely illustrative and obviously suggest various other arrangements which may be adopted without departing from the spirit of the invention and the exclusive use of such modifications as come within the scope of the claims is contemplated.

What is claimed is:

1. A railway brake gear support device comprising a gear engageable portion, elements projecting therefrom and spaced apart and arranged to be mounted in opposing seats on a truck part, and a member insertible between said elements to hold the same spaced apart and thereby retained against movement from their mounting seats.

2. A railway brake gear support device comprising a gear engageable portion, elements projecting therefrom and movable towards each other to permit insertion between opposing mounting seats on a truck part, and a member for insertion between said elements to separate them and hold them in engagement with their respective seats.

3. A railway brake gear support device comprising a gear-engageable portion and elements projecting therefrom for mounting the device on a truck part, said elements being movable to and from each other to permit their insertion between opposed seats on the truck part, the device including spring structure thrusting said elements apart to hold them in engagement with said seats.

4. A brake gear support device comprising a bar-like member doubled on itself with its closed end constructed and arranged to engage brake gear and with its portions adjacent its open end extending alongside of each other and normally thrust to spaced apart position by the resiliency of the material to seat the ends in spaced recesses of a truck part to mount the device.

5. A device as described in claim 4 which also includes a separate element for holding the portions adjacent the open end of the device in spaced relation to each other to prevent their removal from a truck mounting part.

6. A device as described in claim 3 in which the seat-engaging elements include lateral projections for coacting with the seats to prevent withdrawal of the device lengthwise of said elements.

7. A railway brake gear support device comprising a gear-engageable portion and legs projecting therefrom and diverging from each other, and a spreader member insertible between said legs to hold their terminals separated and engaged with mounting elements on a truck main part to prevent the movement of said legs towards each other permitting removal of the device from the truck part.

8. In a railway truck, a truck main part having opposed seats, a brake gear support device carried by said part and projecting therefrom and comprising a pair of relatively movable members between said seats, and a spacer mounted in said truck part and holding said members against said seats to thereby maintain said device and truck part in assembled relation.

9. A structure as described in claim 8 in which the ends of the support members are offset and engage shoulders on the ends of the mounting seats when said members are held apart by the spacer.

10. A railway brake gear support device comprising a bar-like member doubled on itself with its closed end disposed to underlie a portion of the brake gear and with the portions forming its open end inserted between said seats, a spreader inserted between said portions and secured to said part to hold said portions against said seats and maintain the assembly of said part and device.

11. In a railway truck, a truck main part havhaving opposed seats, there being lateral recesses adjacent said seats, a brake gear support device having a portion disposed to underlie a brake gear element of the truck and having relatively movable portions extending between said seats and into said recesses, there being a spreader member inserted between said portions to hold them against said seats and in said recesses to maintain the assembly of said device and said truck part.

12. In a railway truck, a side frame having a bracket with vertical ribs, a brake gear support resting on and projecting from said bracket and including relatively movable members between said ribs, a key extending between said elements and through said bracket and holding said elements against said ribs to position said support on said bracket.

13. In a railway truck, a side frame having a bolster spring seating web, vertical ribs depending from said web, a connection between said ribs below said web, said web, ribs and connection forming an inwardly opening box-like structure, a brake gear support device comprising a portion underlying the truck brake gear, and relatively movable elements inserted through the open end of said structure with their terminals hooked into recesses provided therefor in said structure, and a key extending through said web and connection and holding said elements apart and against said ribs with said terminals in said recesses.

14. In a railway truck, a hollow bolster having an aperture in its wall and shoulders adjacent said aperture, a brake gear support comprising relatively movable elements projecting through said aperture, and a key seated in said bolster and holding said elements against said shoulders, said shoulders and elements having interengaging parts preventing withdrawal of said elements from said bolster when said elements are positioned by said key as described.

15. In a railway truck, a truck main part including a bracket comprising an open-ended box structure, a brake gear support device comprising a portion underlying brake gear of the truck and elements movable towards each other for insertion through the outer open end of said box structure with their terminals offset to engage the inner end of said box structure, and a key extending through said box structure at right angles to said elements to hold said elements and terminals in correlation with said box structure to prevent removal of said device.

16. In a railway truck, a bolster, gear support device comprising a bar doubled on itself to form a loop with its legs upright and having terminals extending into said bolster to mount said device, a brake lever bottom connecting rod extending through said loop and held thereby against dropping to the road bed, one of said legs having an offset extending longitudinally of the truck, and a brake beam member overlying said offset and guarded thereby against dropping to the road bed.

17. In a railway truck, a truck main part having a bracket in the form of a box section with its upper and lower ends open, a brake gear support device including mounting members movable towards each other for insertion through the open ends of said box section bracket and having elements engaging the upper ends of said bracket to support the device, there being a separator extending between said members to hold the same against movement towards each other and to prevent disengagement of said elements and bracket ends.

18. A railway truck side frame including a bolster spring seat and a shelf projecting therefrom, there being elements projecting from the underside of said shelf and forming an inwardly opening box-like structure adapted to receive a brake gear supporting part.

19. A railway truck bolster having a bracket for mounting a brake gear support device, said bracket comprising a box section with its upper and lower ends open through which a portion of said device may be passed, the upper end of said bracket being arranged to support device elements extending transversely of the bracket end.

20. A railway truck side frame including a bolster spring seat and a shelf projecting therefrom, there being elements integral with said shelf forming an open-ended box-like bracket adapted to receive a brake gear support device, the side walls of said bracket being apertured for receiving a member for retaining the device in position in the bracket.

21. A railway brake gear support device comprising a gear engageable portion having arms extending therefrom and alongside of each other and arranged for insertion between spaced shoulders of a truck part on which the device may be carried, said arms being movable towards each other to provide for withdrawal from between said shoulders and from said truck part, and a member for insertion between said arms to hold them spaced apart and in engagement with said shoulders.

DAVID M. LIGHT.